US010979633B1

(12) United States Patent
Blanchet

(10) Patent No.: US 10,979,633 B1
(45) Date of Patent: Apr. 13, 2021

(54) WIDE VIEW REGISTERED IMAGE AND DEPTH INFORMATION ACQUISITION

(71) Applicant: Suometry, Inc., Montreal (CA)

(72) Inventor: Jean-Nicola Blanchet, Verdun (CA)

(73) Assignee: Suometry, Inc., Montreal (CA)

(*) Notice: Subject to any disclaimer, the term of this patent is extended or adjusted under 35 U.S.C. 154(b) by 0 days.

(21) Appl. No.: 16/717,338

(22) Filed: Dec. 17, 2019

(51) Int. Cl.
| | |
|---|---|
| *H04N 5/00* | (2011.01) |
| *B60R 1/00* | (2006.01) |
| *G03B 37/00* | (2021.01) |
| *H04N 5/232* | (2006.01) |
| *H04N 5/225* | (2006.01) |
| *H04N 5/222* | (2006.01) |
| *G03B 37/04* | (2021.01) |

(52) U.S. Cl.
CPC ........... *H04N 5/23238* (2013.01); *B60R 1/00* (2013.01); *G03B 37/04* (2013.01); *H04N 5/2226* (2013.01); *H04N 5/2258* (2013.01); *B60R 2300/105* (2013.01); *B60R 2300/107* (2013.01); *B60R 2300/108* (2013.01)

(58) Field of Classification Search
None
See application file for complete search history.

(56) References Cited

U.S. PATENT DOCUMENTS

| | | | |
|---|---|---|---|
| 9,706,118 B2 | 7/2017 | Chapdelaine-Couture et al. | |
| 2014/0267618 A1* | 9/2014 | Esteban | H04N 5/2226 348/46 |
| 2014/0334668 A1* | 11/2014 | Saund | G06T 7/20 382/103 |
| 2018/0007344 A1 | 1/2018 | Cohen et al. | |
| 2018/0211373 A1* | 7/2018 | Stoppa | G06K 9/4628 |

FOREIGN PATENT DOCUMENTS

CN 108965751 A * 12/2018 ......... H04N 5/23238

OTHER PUBLICATIONS

Won, Changhee, Jongbin Ryu, and Jongwoo Lim. "SweepNet: Wide-baseline Omnidirectional Depth Estimation." arXiv preprint arXiv:1902.10904 (2019).
Seok, Hochang, and Jongwoo Lim. "ROVO: Robust Omnidirectional Visual Odometry for Wide-baseline Wide-FOV Camera Systems." arXiv preprint arXiv:1902.11154 (2019).
Wang, Yanchang, Xiaojin Gong, Ying Lin, and Jilin Liu. "Stereo calibration and rectification for omnidirectional multi-camera systems." International Journal of Advanced Robotic Systems 9, No. 4 (2012): 143.

(Continued)

*Primary Examiner* — Edemio Navas, Jr.
(74) *Attorney, Agent, or Firm* — Occhiuti & Rohlicek LLP

(57) ABSTRACT

A camera system produces omnidirectional RGBD (reg-green-blue-depth) data, similar to a LiDAR but with additional registered RGB data. The system uses multiple cameras, fisheye lenses and computer vision procedures to compute a depth map. The system produces 360° RGB and depth, from a single viewpoint for both RGB and depth, without requiring stitching. RGB and depth registration may be obtained without extra computation and result presents zero parallax misalignment.

23 Claims, 10 Drawing Sheets

(56) References Cited

OTHER PUBLICATIONS

Matzen, Kevin, Michael F. Cohen, Bryce Evans, Johannes Kopf, and Richard Szeliski. "Low-cost 360 stereo photography and video capture." ACM Transactions on Graphics (TOG) 36, No. 4 (2017): 1-12.

Schönbein, Miriam, and Andreas Geiger. "Omnidirectional 3d reconstruction in augmented manhattan worlds." In 2014 IEEE/RSJ International Conference on Intelligent Robots and Systems, pp. 716-723. IEEE, 2014.Schönbein, Miriam, Holger Rapp, and Martin Lauer. "Panoramic 3d reconstruction with three catadioptric cameras." In Intelligent Autonomous Systems 12, pp. 345-353. Springer, Berlin, Heidelberg, 2013.

Schonbein, Miriam, Holger Rapp, and Martin Lauer. "Panoramic 3D Reconstruction with Three Catadioptric Cameras." In Intelligent Autonomous Systems 12: vol. 1: Proceedings of the 12th International Conference IAS-12, Held Jun. 26-29, 2012, Jeju Island, Korea, vol. 193, p. 345. Springer Science & Business Media, 2012.

Szeliski, Richard. Computer vision: algorithms and applications. Springer Science & Business Media, 2010.

\* cited by examiner

WIDE VIEW REGISTERED IMAGE AND DEPTH INFORMATION ACQUISITION

1 BACKGROUND OF THE INVENTION

This invention relates to acquisition of a wide field of view image and depth information and, more particularly, acquisition of registered image and depth information over very wide field-of-view ("FoV"), such as from 120 degrees to full panoramic or 360 degrees.

Multi-camera rigs may, in principle, acquire stereoscopic information from which depth information could be obtained to determine distances to objects in images acquired by cameras in the camera rig. Numerous applications require both the image and the depth information for an object.

Depth describes the volume or shape of a person, thing, or room. Some depth sensing technologies, such as LiDAR, return depth information. But they do not return an image to go with it. Structured light solutions, such as the Microsoft Kinect or Intel RealSense, have a very narrow field of view (FoV)—70×30. There is no fully satisfactory wide field of view (180 to 360 degree), real time, depth with image solution.

Some existing stereoscopic image-based approaches for depth estimation focus on two camera systems using pin hole representations for the lenses. Other existing systems combine a single image representation with an alternative sensor. These include sensors that receive structured light, or in some cases LiDAR.

LiDAR achieves high accuracy on a per point basis. But it has two major limitations. First, there is no image; LiDAR only provides depth. Second, there are major tradeoffs between pixel density, FoV and speed. The first limitation means that the depth information must be fused together with the image. This is particularly true for applications that depend on image-based AI to identify objects and then need to know the distance (e.g. collision avoidance). The second limitation means that one must either wait many minutes per frame to obtain dense, wide FoV information or be content with coarse data at best at 20 FPS in a very narrow band.

The blended sensors can be limited by the FoV of the structured light sensor. They may be able to achieve relatively high frame rates, but only capture information in the overlap between the camera and the sensor.

Some camera systems can achieve high FPS but have limited FoV. Commercial solutions have avoided the use of fisheye lenses because of the additional complexity of the fisheye lens itself, and in establishing the relationships between the lens and sensor (intrinsic calibration) and between the two cameras (extrinsic calibration).

2 SUMMARY OF THE INVENTION

In a general aspect, a camera system produces wide FoV RGBD (reg-green-blue-depth) data in real time, similar to a LiDAR but with additional registered RGB data. The system uses cameras, fisheye lenses and computer vision algorithms to compute a depth map. The system produces panoramic (e.g., from 360°×60° to 360°)×180° RGB and depth data from a single viewpoint for both RGB and depth without requiring stitching. RGB and depth registration may be obtained without extra computation and the result presents zero parallax misalignment.

In another aspect, in general, a camera system includes a set of secondary cameras and a primary camera. The cameras are arranged such that the primary camera is not occluded by any of the secondary cameras over a field of view of interest. In some embodiments, the secondary cameras are disposed around a primary camera. In such embodiments, the secondary cameras can be referred to as "radial cameras" and the primary camera can be referred to as the "central camera."

Processing using this camera system includes the following steps:
1. Simultaneously acquiring Images from all the cameras.
2. For each secondary camera:
   a. Rectifying the frames from the primary and secondary cameras using an omnidirectional angular rectification method, thereby aligning the epipolar circles in the spherical domain with the extrinsic positions of the cameras. The resulting projection, which is also known as transverse equirectangular projection, is aligned with the two cameras. Intrinsic and extrinsic calibrations of the cameras are necessary to perform this step.
   b. Using stereo matching algorithms to estimate depth from the rectified images.
   c. Convergint the resulting angular disparity map to a depth map (or XYZ) using triangulation.
   d. Reprojecting the resulting depth map to its original spherical fisheye projection (a.k.a. equisolid projection), thus causing the estimated depth to now be perfectly aligned with the original unprocessed RGB image.
3. Aggregating the depth maps into a single depth map.

A variety of ways are available for carrying out the aggregation. A particularly simple method is that of selecting the depth from the camera pair with the highest effective parallax (statistically the lowest error) and blending the maps with a small feather band to smooth out minor discontinuities.

An alternative aggregation method relies on computing disparities between observations by different camera pairs and defining an image in a "disparity space." This image represents, for each point, a cost function associated with each camera pair used to estimate the depth at that point. These cost functions are then normalized to a common reference frame and unit in all dimensions. For a given point, the cost functions at that point are merged and the resulting merger is used as a basis for inferring a depth at that point.

Yet another alternative is to determine weights to apply to each camera pair's observation using a neural network that has been trained using inputs from the cameras.

A third alternative includes carrying out plane sweeping for each of the secondary cameras using the primary camera as the reference. This results in three camera pairs. Plane sweeping results in a single cost volume with the cost function being the sum of the costs associated with the three camera pairs.

Optionally, the resulting RGBD data may be converted to a point cloud or cropped and undistorted to a planar projection for further processing by the end user.

In one aspect, the invention features an apparatus that includes a camera rig and image-processing circuitry that is coupled to the camera rig.

The camera rig includes cameras. In particular, the camera rig includes a primary camera and secondary cameras. The primary camera has a primary field-of-view. Each secondary camera has a corresponding secondary field-of-view. The secondary cameras are disposed to avoid occluding the primary camera's field-of-view, i.e., the primary field-of-view.

The cameras collectively define several camera pairs. Each camera pair includes the primary camera and one of the secondary cameras. The constituent cameras of a camera pair have overlapping fields of view.

The image-processing circuitry generates first data based on second data. The first data represents a stitch-free panoramic image that includes those portions of each of the respective secondary fields-of-view that lie within the primary field-of-view. The first data also includes a depth map that is registered with the panoramic image. The second data represents images obtained from each of the camera pairs and corresponding depth maps registered with each of the images. The image-processing circuitry carries out the foregoing operations in a non-abstract manner and not in an abstract manner.

Embodiments can have different numbers of secondary cameras. Among these are embodiments with only two secondary cameras and embodiments with three secondary cameras.

A variety of locations are possible for the primary camera. For example, in some embodiments, the primary camera is disposed on a first plane that is offset from a second plane on which the secondary cameras are disposed. The primary camera can be centered relative to the secondary cameras so that it is equidistant from each secondary camera. However, this is by no means a requirement.

Each camera typically includes a lens. Embodiments include those in which the cameras' lenses have different orientations relative to each other. In some embodiments, the lens axes align with each other. In other embodiments, at least two of the lens axes point in different directions.

In other embodiments, the lens' axes are oriented to increase pixel density in those regions of the primary camera's focal plane that correspond to overlaps with images seen by the secondary cameras.

Some embodiments feature a vehicle. In such embodiments, the cameras are disposed around the vehicle. This permits the vehicle's operator to enjoy the benefit of a stitch-free panoramic image that also indicates how far away surrounding objects are from the vehicle.

Yet other embodiments feature an industrial robot. In such embodiments, the cameras are disposed around the industrial robot so that the robot can recognize the distances to various objects in its vicinity and take action to avoid colliding with those objects. This reduces the likelihood of industrial accidents.

Further embodiments include those in which one of the cameras has a fisheye lens. Among these are embodiments in which the fisheye lens' axis is oriented vertically and embodiments in which the primary camera includes the fisheye lens.

Among the embodiments are those in which the image-processing circuitry carries a first procedure that includes transforming the first image for the secondary camera of the camera pair and the first image for the primary camera according to a first transformation and a second transformation. The first and second transformations are based on a spatial relationship between the secondary camera and the primary camera. This first procedure yields a pair of second images. One image of the pair results from having applied a first transformation of the first image from the secondary camera. The other image of the pair results from having applied a second transformation of the first image from the secondary camera. The procedure continues with computing second depth information from the pair of second images. This second depth information is represented in registration with the second image from the primary camera. The procedure also includes transforming the second depth information to yield first depth information based on the second-ary camera. This first depth information is registered with the first image from the primary camera.

Among the foregoing embodiments are those in which transforming the second depth information to yield the first depth information includes transforming the second depth information into a space defined by a focal plane of the primary camera.

Also among the foregoing embodiments are those in which transforming the second depth information to yield the first depth information includes transforming the second depth information into a space that is isomorphic to a space defined by a focal plane of the primary camera.

Also among the foregoing embodiments are those in which the image-processing circuitry executes a second procedure after having completed the first procedure. This second procedure includes combining the first depth information obtained from each of the different camera pairs to yield combined depth information. This combined depth information is registered with the first image from the primary camera.

Among the foregoing embodiments are those in which, for each camera pair, the image-processing circuitry assigns a weight to the first depth information acquired by the camera pair and combines the first depth information based at least in part on the weights assigned to the camera pairs. In some of these embodiments, the image-processing circuitry assigns this weight based on a parallax error associated with the camera pair. In others of these embodiments, a neural network of the image-processing circuitry determines the weights to be assigned to each camera pair when combining the first depth information obtained by each of the camera pairs to obtain the combined depth information.

Embodiments further include those in which, for each secondary camera, the image-processing circuitry carries out plane sweeping of the secondary camera using the primary camera as a reference. This defines a single cost volume with a cost function. The cost function is derived from costs associated with the camera pairs.

In another practice, the invention includes a method for acquisition of image and depth information using a plurality of cameras. The cameras include a primary camera and secondary cameras. Each secondary camera has a particular spatial relationship with the primary camera. The method includes acquiring a plurality of first images. Each image of the plurality of the first images is acquired via a respective camera of the plurality of cameras. A first image from the primary camera represents a primary field of view. Each first image of a secondary camera of the plurality of secondary cameras represents a field of view that includes at least a part of the primary field of view.

The method also includes carrying out certain steps for each secondary camera of the plurality of secondary cameras. These steps include transforming the first image for the secondary camera and the first image for the primary camera according to a first transformation and a second transformation. These transformations are based on the spatial relationship between the secondary camera and the primary camera. This yields a pair of second images. One second image from the pair is a first transformation of the first image from the secondary camera. The other second image is a second transformation of the first image from the primary camera.

These steps also include computing second depth information from the pair of images. The second depth information is represented in registration with the second image from the primary camera.

These steps further include transforming the second depth information to yield first depth information based on the secondary camera. This first depth information is registered with the first image from the primary camera.

The method further includes combining the first depth information based on the plurality of secondary cameras. This yields combined depth information. The resulting combined depth information is registered with the first image from the primary camera.

In another aspect, the invention features a processor and first, second, and third cameras having corresponding first, second, and third fields-of view. The third field-of-view encompasses the first and second fields-of-view. The processor generates first information that is indicative of distance to points within a field-of-view of both cameras of a pair of cameras. The pair of cameras is either the first camera and the third camera or the second camera and the third camera.

In another aspect, the invention features a processor, a primary camera having a primary field-of-view, and at least first and second secondary cameras. The primary field-of-view encompasses the fields-of-view of the first and second secondary cameras. The processor generates depth information for objects in the field-of-view of the first secondary camera using image data from both the primary camera and the first secondary camera and depth information for objects in the field-of-view of the second secondary camera using image data from both the primary camera and the second secondary camera. The processor generates first information that is indicative of distance to points within a field-of-view of both cameras of a pair of cameras, the pair being selected from the group consisting of the first camera and the third camera and the second camera and the third camera.

In another aspect, the invention features a processor and first, second, and third cameras having corresponding first, second, and third fields-of view. The third field-of-view encompasses the first and second fields-of-view. The processor generates first information. The first information is indicative of distance to points within a field-of-view of both cameras of a pair of cameras. The pair is selected from the group consisting of the first camera and the third camera and the second camera and the third camera.

Embodiments include those in which the third camera is between the first and second cameras, those in which the third camera lies on a line that bisects a distance between the first and second cameras, and those in which the first and second cameras lie on a horizontal plane and the third camera lies on a plane that is parallel to the horizontal plane.

In some embodiments, one or more of the cameras includes a fisheye lens.

In other embodiments, the processor generates second information based on data from the third camera. The second information is indicative of an image within the field-of-view of both cameras of a pair of cameras.

The image-processing circuitry as described and claimed herein has a technical effect because it causes images and depth maps to be registered with each other and does so using technical methods and devices. The description describes only those implementations that are non-abstract. Hence, the claims can only cover non-abstract embodiments. Any attempt to construe the claims to cover abstract embodiments is hereby declared to be a construction that is inconsistent with the specification.

As used herein, "abstract" is defined to mean what it means to the courts of the United States as of the filing date of this application and "non-abstract" is defined to mean the converse of "abstract." In addition, the claimed subject matter confers a technical improvement by permitting a wide angle image and a depth map to be registered with each other.

Other features and advantages of the invention are apparent from the following description, and from the claims.

3 BRIEF DESCRIPTION OF THE DRAWINGS

4 DETAILED DESCRIPTION

Figure 1:
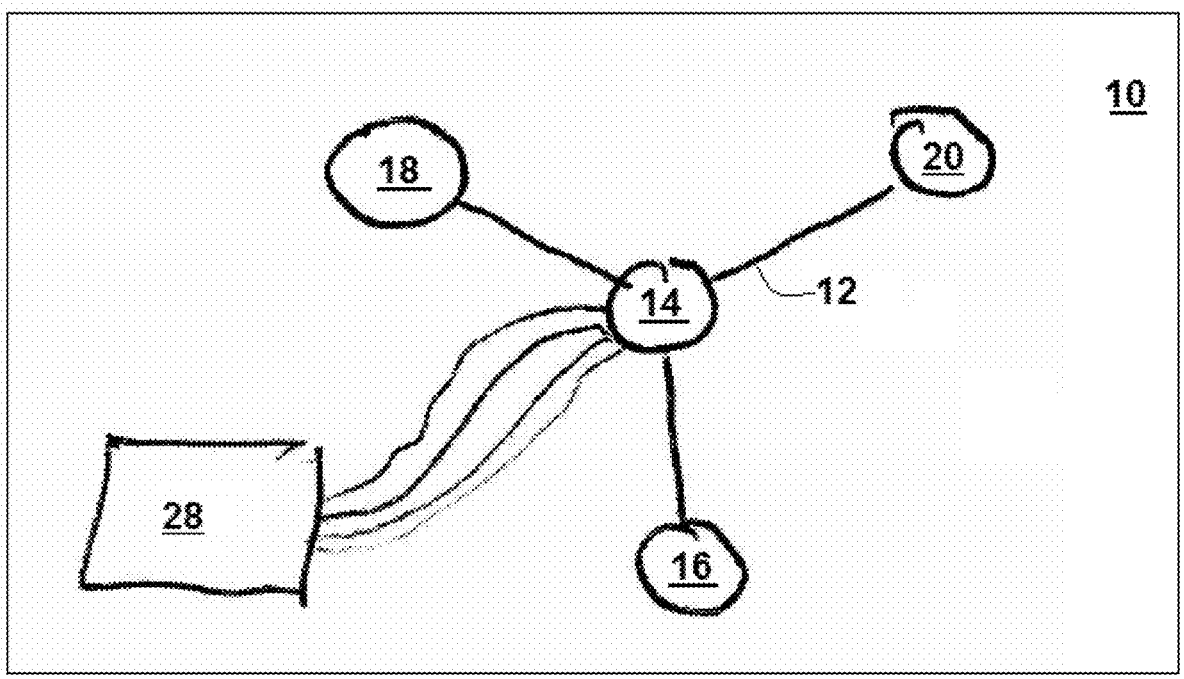
FIG. 1 is a top view of a camera rig.
Figure 2:
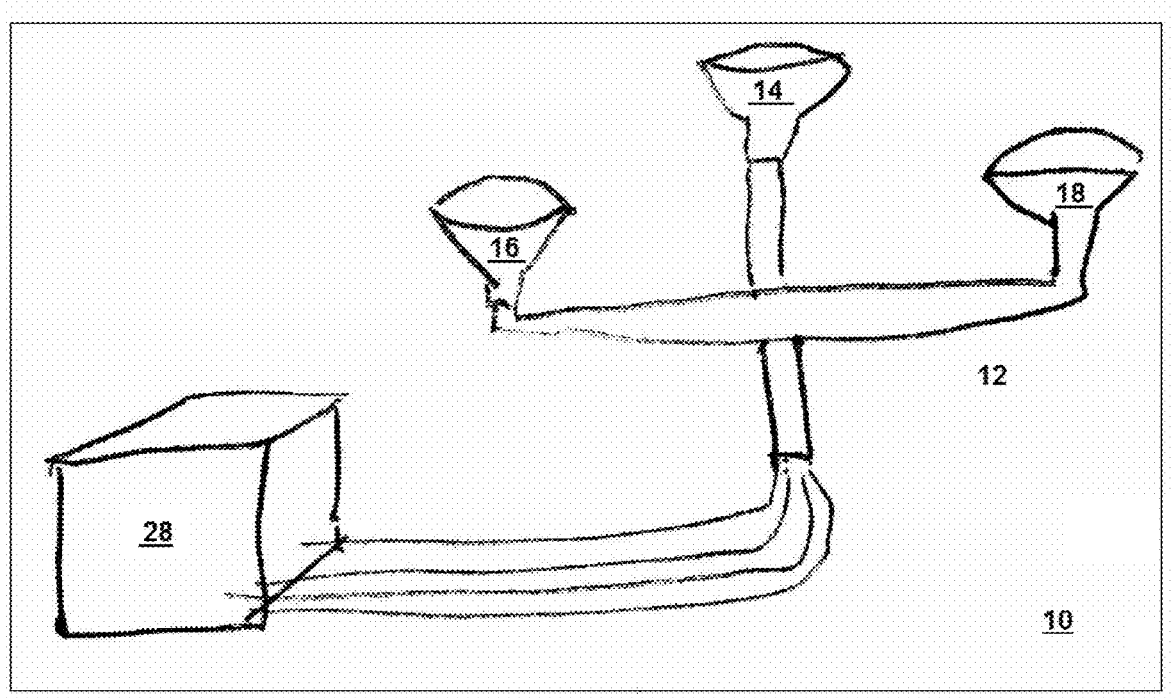
FIG. 2 is a side view of the camera rig shown in FIG. 1.

FIGS. 1 and 2 show top and side views of a camera rig 10 having a support 12 that supports a primary camera 14 and secondary cameras 16, 18, 20. The support 12 holds the secondary cameras 16, 18, 20 in such a way that they collectively see in some or all of the directions that can be seen by the primary camera 14. In some embodiments, the cameras 14, 16, 18, 20 include one or more cameras with fisheye lenses oriented vertically. In a preferred embodiment, the primary camera 14 has a fisheye lens. The secondary cameras 16, 18, 20 need not have fisheye lenses in alternative embodiments The cameras 14, 16, 18, 20 provide images that are processed by circuitry 28 using one or more image-processing procedures to yield a panoramic colored image together with corresponding depth information that is registered with the panoramic image. As used herein, a "panoramic" image is an image that has a substantially 360° view. A "colored" image is typically implemented as an RGB image. The resulting panoramic image, which incorporates depth information that has been registered with the image, can be referred to as an "RGBD" image.

As best seen in FIG. 2, the primary camera 14 lies above the plane on which the secondary cameras 16, 18, 20 lie. As a result, the primary camera 14, does not see any other cameras (i.e., its view is not occluded by any other camera). Therefore, unlike the secondary cameras 16, 18, 20, the primary camera 14 has an unobstructed 360° view. This avoids the problem of self-occlusion by the camera rig. It also permits implementation of an image-processing procedure that avoids the need to stitch together multiple images to form a panoramic view.

Since the primary camera 14 has an unobstructed view, it is used to create a single-viewpoint RGB image without such artifacts as stitch lines, warping, and occlusion. The primary camera 14 cannot, however, determine depth information for the pixels in the single-viewpoint RGB image that it acquires.

However, with the assistance of each secondary camera, 16, 18, 20, the calculation of depth information becomes possible. As a result of the cooperation between the primary camera, with its obstruction-free view, and the secondary cameras, which provide a second point-of-view, it becomes possible to form a panoramic RGB image that incorporates depth information that is registered with the panoramic RGB image acquired by the primary camera.

The support 12 thus causes each camera 14, 16, 18, 20 to have a particular spatial configuration. As used herein, a "spatial configuration" is hereby defined to mean the location of the camera and the orientation of that camera. The support 12 also defines a spatial relationship between any two cameras. As used herein, the term "spatial relationship" between two cameras is hereby defined to mean a relationship between the two cameras' locations and/or their orientations.

In some configurations, the fisheye lenses are oriented in the same direction. Among these are configurations in which the fisheye lenses are oriented with their axes pointing vertically. However, in other configurations, the axes are rotated to increase pixel density in those regions of the primary camera's focal plane that correspond to overlaps with images seen by the secondary cameras.

Figure 3:
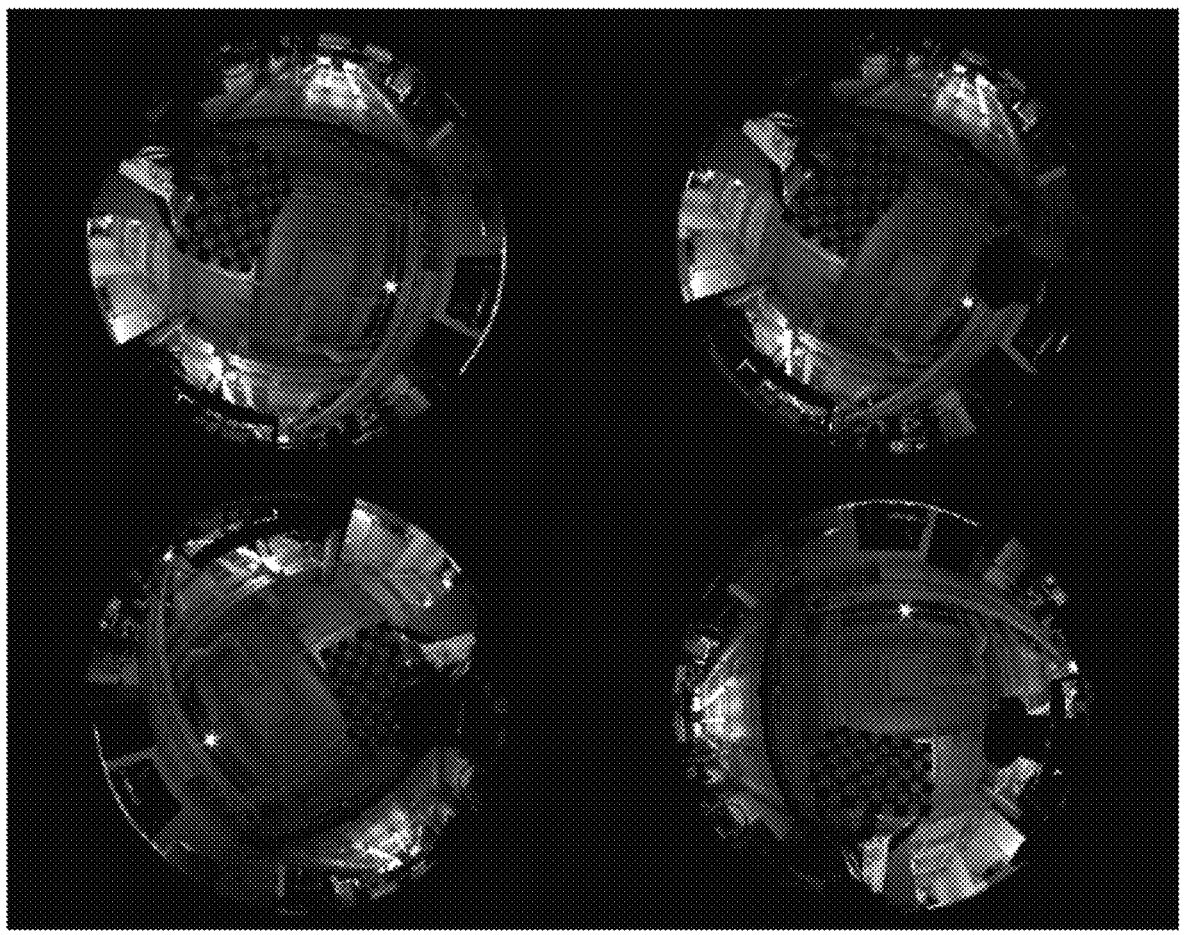
FIG. 3 shows images acquired by the cameras from the camera rig in FIG. 1.

Light entering a camera forms an "image," (i.e., on an array of photosensors of the camera) the extent of which depends on the camera's field-of-view. This depends on the nature of the camera's lens. For example, in the case of a camera having a fisheye lens, the field-of-view extends over a considerable angular range. In some cases, the field-of-view extends 360° horizontally as much as 280° degrees across the lens. FIG. 3 shows examples of images formed by the cameras shown in FIG. 1 when using a lens having a 250° field-of-view.

For ease of exposition, it is useful to define a "overlap" as being an intersection of two images. In the limiting case, a first image can include the entirety of a second images. In that case, the "overlap" includes the entire second image.

Figure 4:
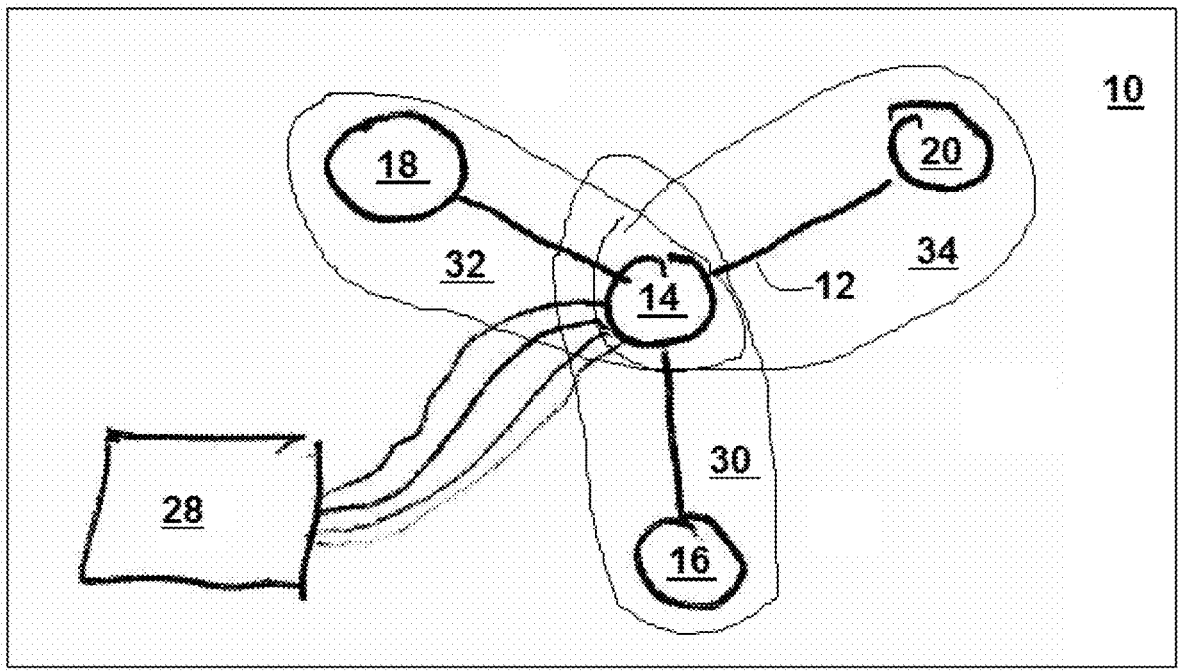
FIG. 4 shows the camera rig of FIG. 1 with the cameras grouped into pairs.

Referring now to FIG. 4, the camera rig 10 shown in FIG. 1 has three camera pairs 30, 32, 34, each of which includes the primary camera 14 and one of the secondary cameras 16, 18, 20. The primary camera's field of view is such that, for each camera pair 30, 32, 34, the primary camera 14 and the secondary camera 16, 18, 20, there will exist an overlap between an image obtained by the primary camera and that obtained by the secondary camera 16, 18, 20. As a result, the first camera pair 30 provides a stereoscopic view of the overlap. From this stereoscopic view, it is possible to determine a distance from the camera rig ("depth") with each point in the overlap.

This set of estimated distances and the association of distances with points in the overlap is referred to as a "depth map." To the extent that each value of depth is assigned to the corresponding point of the image in the overlap, that depth map and the overlap are said to be "registered" with each other.

All four images are acquired at the same time, and the second and third camera pairs 32, 34 are also used to compute depth only with different overlaps. As a result, the camera rig 10 concurrently makes available three separate depth maps for three different overlaps. Because of the locations and orientations of the cameras, these three different overlaps, and their associated depth maps, collectively span a substantially 360-degree field-of-view.

At the end of the foregoing procedure, the camera rig 10 will have acquired three images and three depth maps that collectively cover most if not all of a 360-degree azimuthal field of view. However, this is not the same as a single panoramic image with a depth map for the entire image.

The process for forming a single wide-angle image integrates these overlaps and depth maps. Given the camera rig 10 as illustrated, and in particular the fact that the primary camera 14 is common to each camera pair 30, 32, 34, it is possible to do so without recourse to stitching the three overlaps together. This is advantageous because the stitching process can result in errors.

Figure 5:
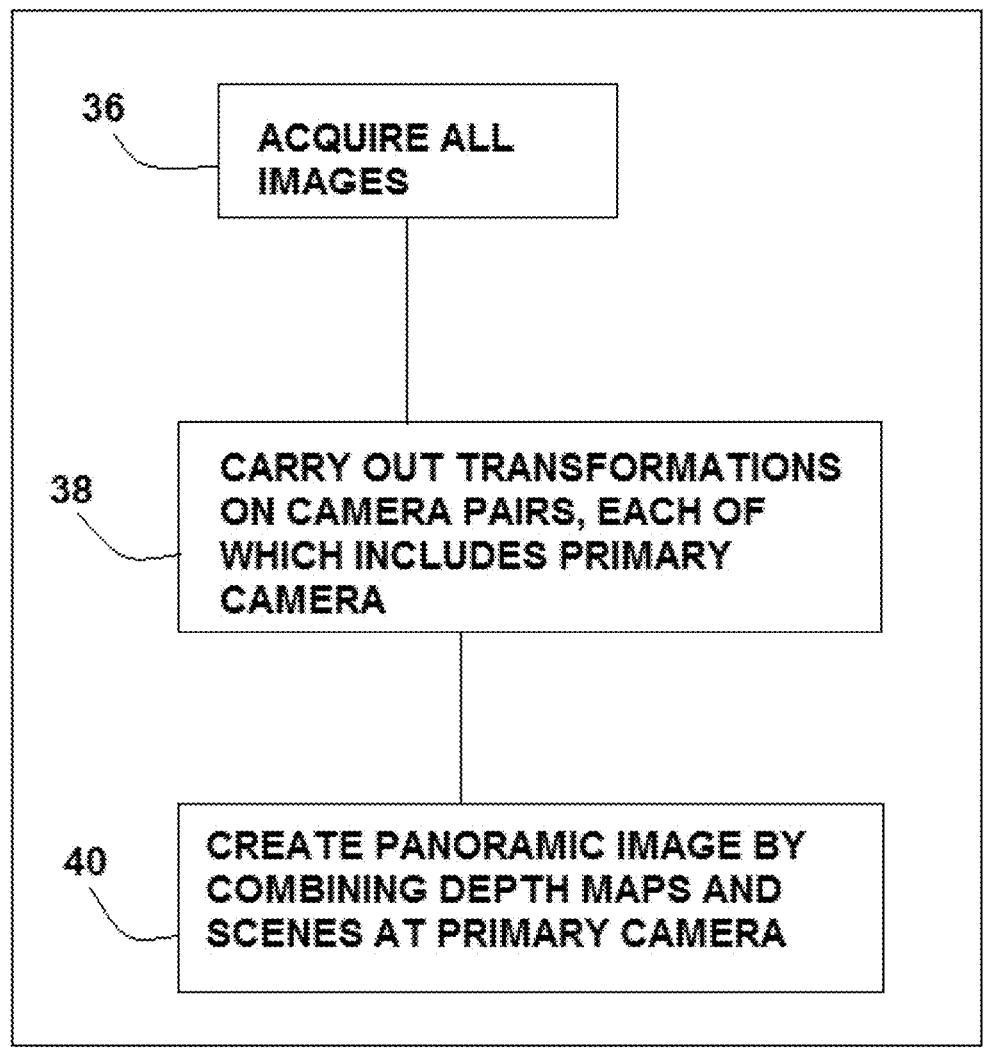
FIG. 5 is a top-level view of a procedure for operating the apparatus for operating the system shown in FIG. 1.

Referring now to FIG. 5, the process for integrating the overlaps begins with the acquisition of all the images by all the cameras (step 36). Preferably, these images are acquired simultaneously.

This is followed by a series of transformations (step 38) that are carried out for each pair of cameras. The transformations (step 38) result in three depth maps, each of which is registered with the image acquired by the primary camera 14. Since the image acquired by the primary camera 14 contains all three overlaps, the primary camera 14 will now have all the information needed for the circuitry to construct a single panoramic image with a single depth map. This is carried out in a combining step (step 40).

Figure 6:
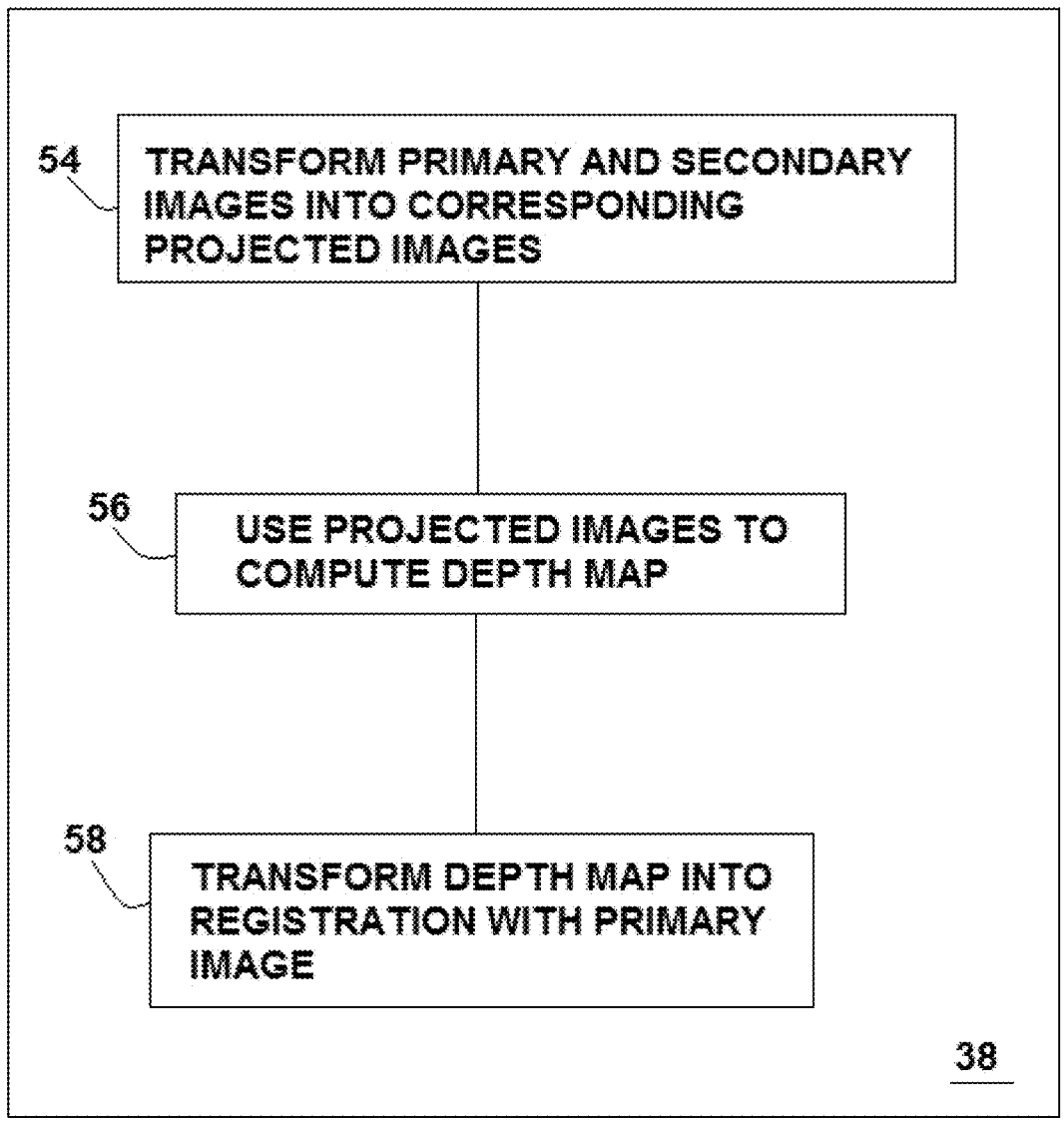
FIG. 6 shows details of a camera-pair loop from the procedure shown in FIG. 5.

FIG. 6 shows details of the transformations (step 38) as applied to the first camera pair 30. The transformations applied to the remaining camera pairs 32, 34 are identical in nature and therefore need not be described.

Figure 7:
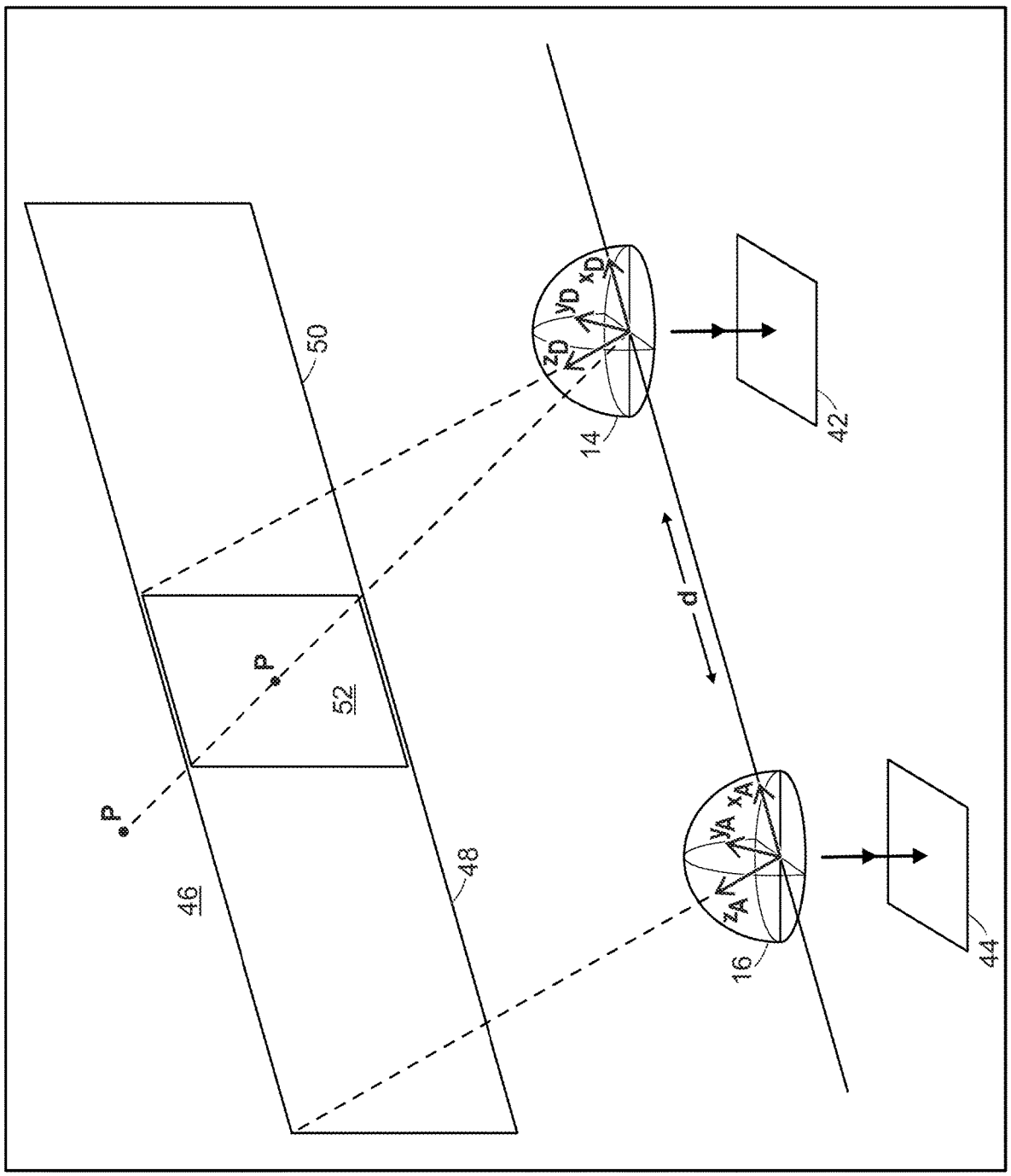
FIG. 7 shows the operation of one pair of cameras from the apparatus shown in FIG. 1.

In connection with FIG. 6, it is useful to consider FIG. 7, which shows the primary camera 14 forming a primary image 42 and the secondary camera 16 forming a secondary image 44.

As shown in FIG. 7, the primary camera 14 has a local coordinate system that identifies particular locations in space. This local coordinate system has orthogonal axes XD, YD, and ZD. The origin of this local coordinate system is the entrance pupil of the camera's lens, which in some cases is a fisheye lens. This will be referred to herein as the primary camera's "center."

Similarly, the secondary camera 16 has its own local coordinate system that also identifies particular locations in space. This local coordinate system has orthogonal axes XA, YA, and ZA. The origin of this local coordinate system is the secondary camera's "center."

A first transformation is that of transforming the primary and secondary images 42, 44 into corresponding projected images in the same projection plane (step 54). This transformation, which is carried out as part of intrinsic and extrinsic camera calibration, includes aligning the local coordinate systems of the primary and secondary cameras 14, 16. In FIG. 6, this has resulted in the XA and XD axes being colinear and causing the ZA and ZD axes being parallel. This alignment depends only on the spatial relationship between the primary and secondary cameras and therefore can be carried out as part of a static calibration procedure or geometric calibration of each pair of cameras.

The static calibration includes determining one or more rotations that will orient the local coordinate systems so that they are "parallel." This means that there exists a plane that passes through each camera center, that this plane is an XZ plane, and that the two Z directions, namely those defined by the ZA and ZD axes, are parallel. A plane is an "XZ" plane if XA, XD, ZA, and ZD all lie in this plane.

A suitable transformation is an omnidirectional angular rectification procedure to rectify the local coordinate systems of the primary and secondary cameras 14, 16. This results in the epipolar circles of the primary and secondary cameras 14, 16, as seen in the spherical domain, becoming aligned with the extrinsic positions of the primary and secondary cameras.

The first transformation continues at runtime for each camera pair 30, 32, 34, of which only the first camera pair 30 is discussed herein. The runtime portion of the first transformation includes carrying out a projection relative to the foregoing XZ plane. This includes projecting the primary image 42 and the secondary image 44 onto a common projection plane 46. This forms a projected primary image 48 and a projected secondary image 50. As a result, there now exists a mapping from the primary image 42 and the secondary image 44 into a plane in which stereo matching can be performed to determine depth information at runtime. In some embodiments, this mapping is an equirectangular projection and in particular, a transverse equirectangular projection that is aligned with the primary camera 14 and the secondary camera 16. This mapping is also part of a static calibration procedure because it too depends only on the geometric calibration of the first camera pair 30.

The projected primary image 48 and the projected secondary image 50 intersect at an overlap 52. Since the overlap 52 is viewed by both the primary and secondary cameras 14, 16, it is possible to use a stereo matching procedure to create a depth map for that overlap 52 (step 56). In some embodiments, stereo matching is carried out independently on each horizontal line.

Creating a depth map requires identifying points in the overlap 52 and assigning a depth value to each point. A typical stereo matching procedure results in an angular-disparity map that can then be converted into a depth map using principles of three-dimensional reconstruction rooted in triangulation. To identify points in the overlap, a coordinate system must be used. Because the depth map is created in the projection plane 46, the points in the overlap 52 are identified in terms of the projection-plane's own coordinate-system.

A representation in the projection-plane's coordinate-system is ultimately not all that useful. After all, the circuitry 28 shown in FIGS. 1 and 2 connects to the cameras 14, 16, 18, 20 and not to a projection plane 46. Therefore, once the depth map has been created, it is useful to represent the points in the overlap 52 using a primary camera's local coordinate system. Because the primary camera 14 is common to each camera pair 30, 32, 34, a particularly useful choice is the primary camera's local coordinate system.

The second transformation is therefore that of transforming the depth map so that points on the overlap 52 are on longer identified by coordinates in the projection plane's coordinate system (step 58). Instead, they are identified using the primary camera's local coordinate system. This places the depth map into registration with the primary camera's first image 42.

In those embodiments in which the primary camera 14 is a fisheye, the second transformation includes carrying out an equisolid projection. This includes reprojecting the depth map into the original fisheye projection. This projection causes the depth map to become perfectly aligned with the original RGB image, namely the primary image 42.

The foregoing procedure is carried out for each camera pair 30, 32, 34. As a result, there will be three different depth maps for three difference overlaps. All three depth maps will have been registered with the same primary image 42. Since the primary camera 14 participated in each stereo matching procedure, it must already have the three overlaps in the primary image 42. Accordingly, the primary image 42 now has the information needed to produce one wide-angle panoramic image with a depth map.

The final step is to aggregate the three depth maps formed by the three camera pairs 30, 32, 34 into a single depth map, referred to herein as the "aggregate depth map."

In general, the overlaps 52 used in each camera pair 30, 32, 34 may have some points in common. This means that the primary image 42 may include more than one depth value for the same point. These different depth values would have been contributed by different camera pairs 30, 32, 34. In such cases, these different values for the same point in an overlap can be used to improve the estimate for the depth value at that point.

A variety of aggregation methods can be used. One method would be that of, defining an aggregated depth at a point by the average these different values. Another method would be to define the aggregated depth at a point by weighting the estimates based on some a priori knowledge of expected error. For example, one aggregation method uses, as the aggregated depth, the depth associated with whichever camera pair yielded the highest effective parallax between the observation by the primary camera 14 and the observation by the secondary camera 16. This depth would have the statistically lowest error. In such cases, there may be minor discontinuities that can be smoothed out by blending the depth maps with a small feather band.

Figure 8:
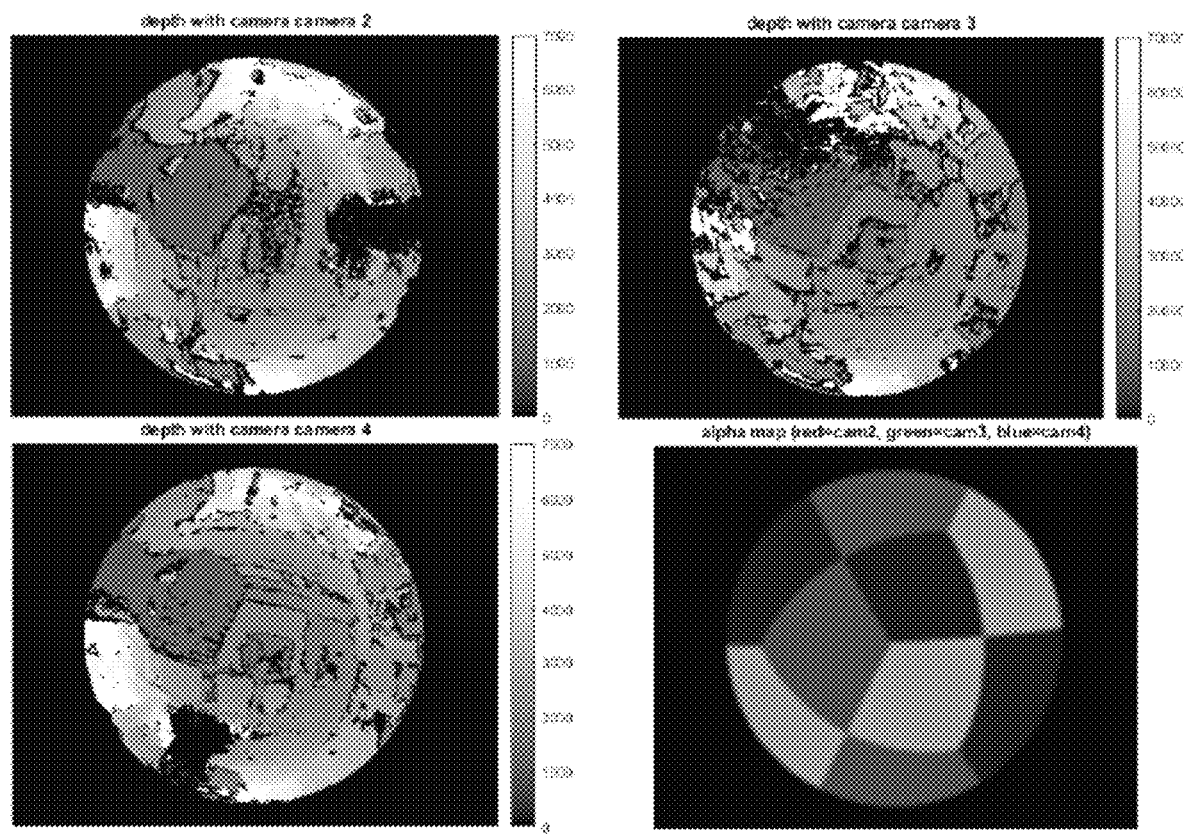
FIG. 8 shows depth maps from the three camera pairs of FIG. 3 together with a blending map.
Figure 9:
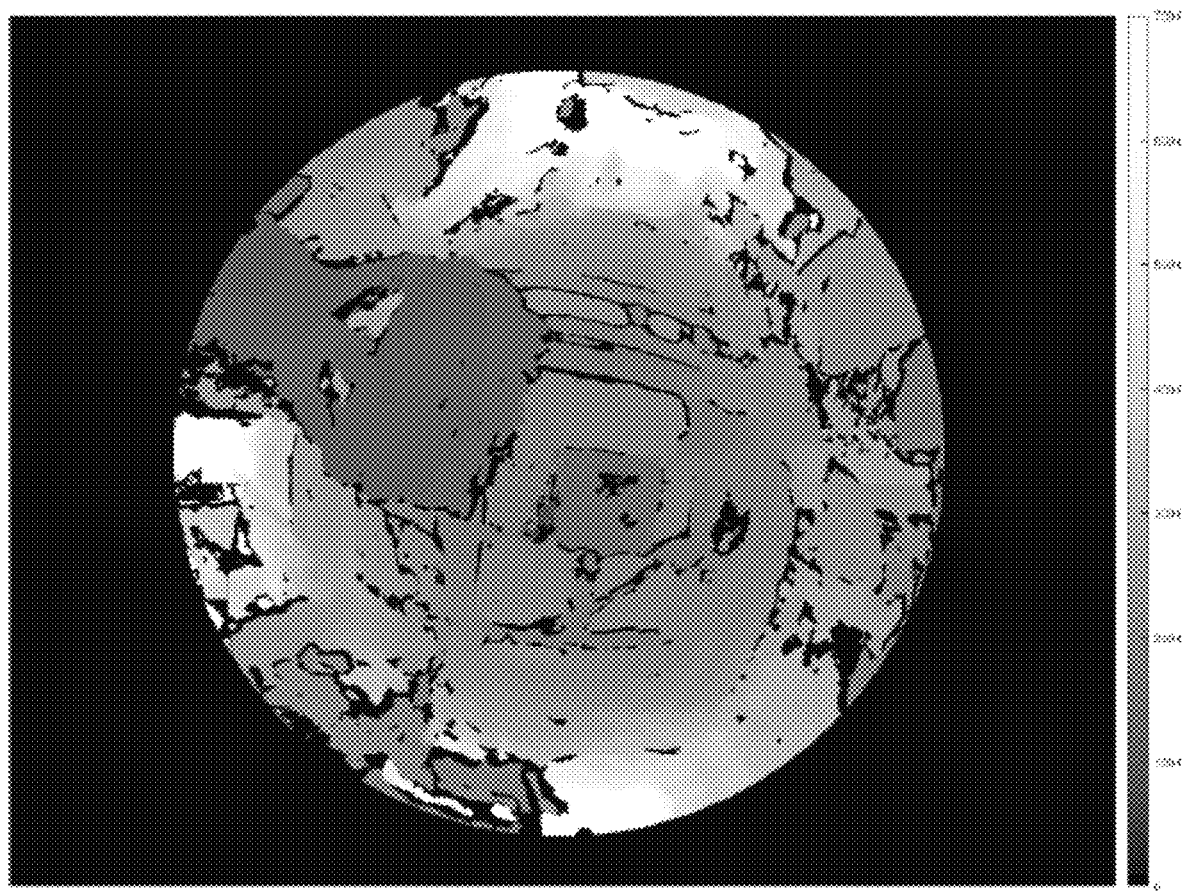
FIG. 9 shows the depth maps of FIG. 8 after having been merged using the blending map of FIG. 8.
Figure 10:
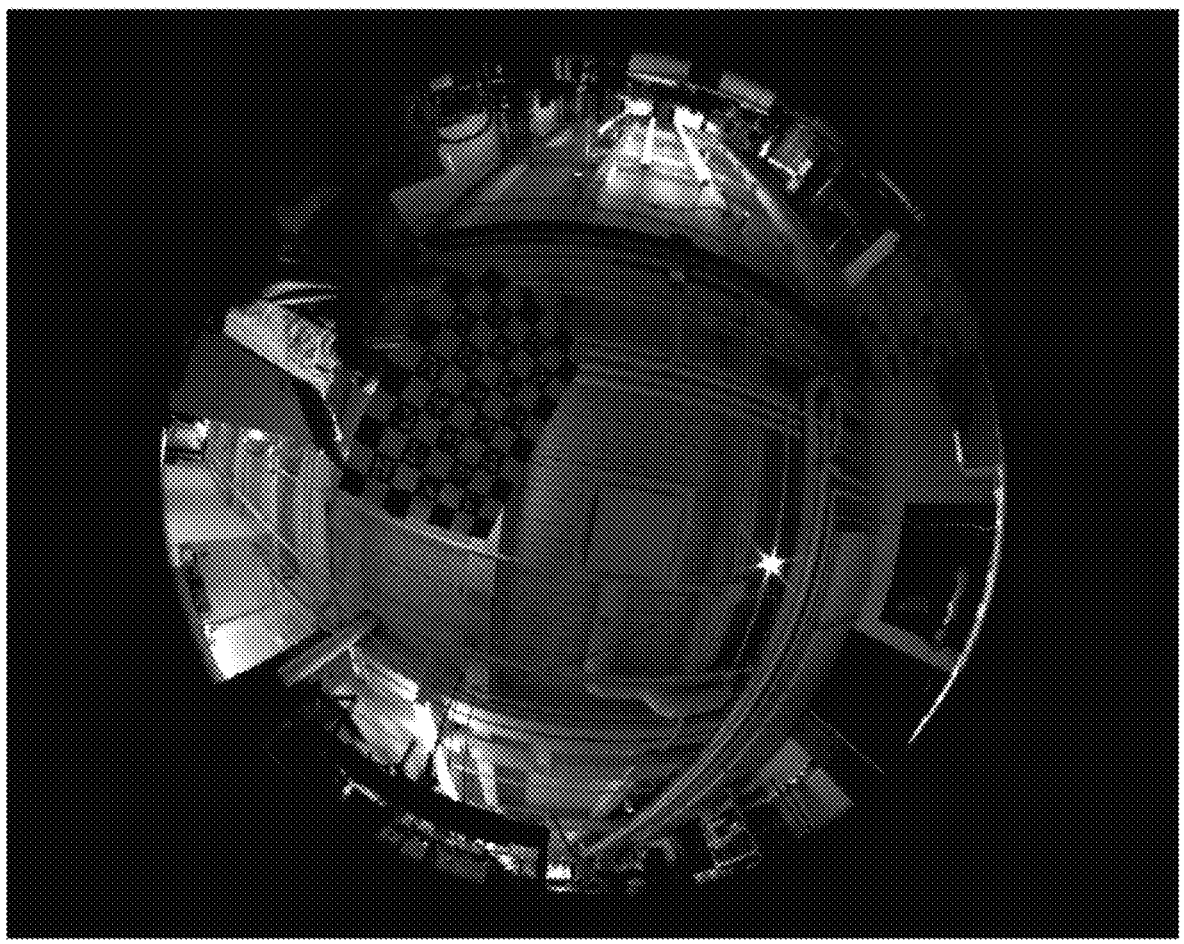
FIG. 10 shows the panoramic image from the primary camera of FIG. 1 that is used in combination with all of radial cameras to generate the fully registered depth map.

FIG. 8 shows examples of depth maps produced by each of the three camera pairs 30, 32, 34 in FIG. 4 together with a blending map indicative of which secondary camera 16, 18, 20 measured the highest effective parallax relative to the primary camera 13 in each region of the primary image 42. FIG. 9 shows an aggregate depth map formed by using the blending map of FIG. 8 to blend the three depth maps shown in FIG. 8. The aggregate depth map shown in FIG. 9 is formed by choosing, for each pixel of the primary image 42, whichever of the three depth maps in FIG. 8 relied on the highest effective parallax when estimating a depth for that pixel.

Having been augmented by a depth map, the primary image now provides RGBD data. This RGBD data can be converted into a point cloud. Alternatively, it can be cropped and have its distortions removed and converted into a planar projection for further processing by an end user.

The embodiment has been described in terms of a camera rig 10 having three secondary cameras 16, 18, 20. This embodiment is useful because lenses with 120-degree fields-of-view are readily available. However, the principles described herein are applicable to an embodiment with only two secondary cameras. For those applications in which the camera rig 10 is used in an environment with a great many obstructions, it may be useful to have more than three secondary cameras. For example, when operating a battle-field tank, it is often useful to have a panoramic view with distances to targets. However, it may be impossible to ensure a panoramic field of view with only three cameras because of obstructions from the tank's turret. This difficulty can be overcome by having more secondary cameras, while still using a single primary camera with a complete view.

In some embodiments, the circuitry 28 that implements the foregoing procedures is hardware, such as an application-specific integration circuit, in which transistors, diodes, and other electrical circuit elements are interconnected in such a way as to carry out the foregoing procedure. However, in other embodiments, the circuitry 28 includes a processing system in which a processor that executes instructions that result in carrying out the foregoing procedures.

Although the cameras have been described as acquiring an RGB image, the principles described herein are applicable to any kind of image information. There is no need to have three-channel image information such as RGB. The image information could represent a single channel. For example, the image could be monochromatic.

Additionally, the principles described herein are not wedded to any particular wavelength. Although described in terms of visible wavelengths, the cameras could be infrared cameras and the image could be an infrared image. The registration procedure depends on carrying out appropriate transformations on image and is agnostic to the nature of the image and what it represents. In FIGS. 1 and 2, the primary camera 14 is shown as being elevated above the plane of the secondary cameras 16, 18, 20. However, this is only one of many ways to configure the cameras so that the primary camera 14 in a way that avoids obstructions.

In some applications, it is not necessary to have a panoramic view. Certain applications require only require a 180-degree field of view. This might be the case in a forward-facing application in which there is no interest in what goes on behind the camera. In such cases, the primary camera 14 could be one having a wide-angle lens rather than a fisheye lens.

The embodiments described herein rely on the primary image 42 as being a common reference to be used for depth maps produced by all camera pairs 30, 32, 34. While this is a convenient choice, it is not the only choice. It is also possible to use a common reference other than the primary image 42.

Yet other applications are those in which only stereoscopic vision is sought and no point cloud or depth map is required. Such applications benefit from the existence of a camera with an unobstructed field-of-view, such as the primary camera 14, to provide stereoscopic views over a wide angle without obstructions.

Figure 11:
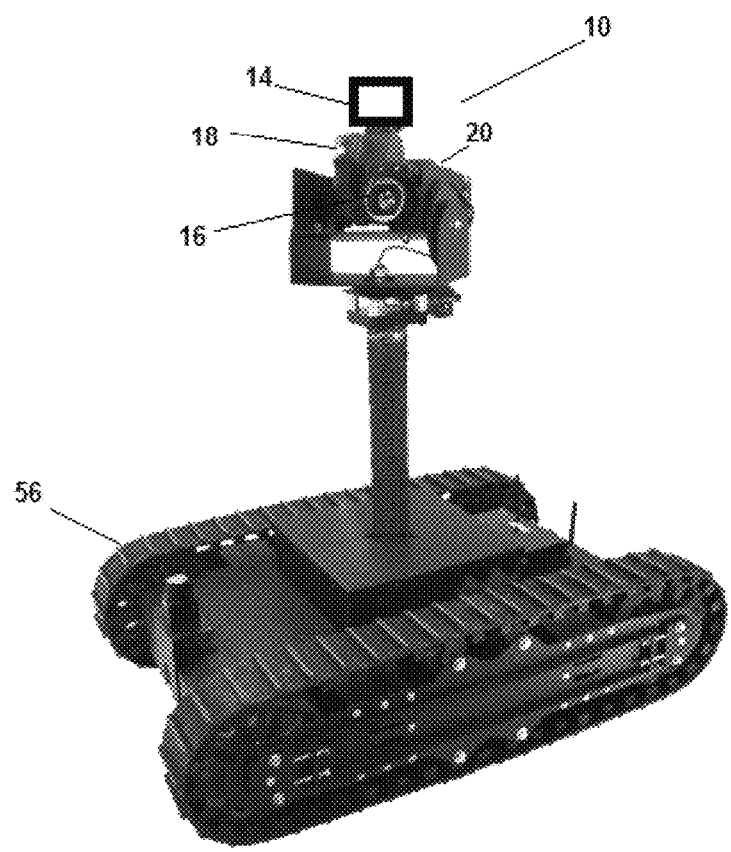
FIG. 11 shows a rig deployed on a vehicle, and in particular, an industrial robot.

FIG. 11 shows a vehicle 56, which in this case is an industrial robot, on which a camera rig 10 having a primary camera 14 and secondary cameras 16, 18, 20 has been deployed. The illustrated camera rig 10 permits the industrial robot to obtain a panoramic image with a registered depth map, thus enhancing its ability to see the surrounding environment and thus avoid collisions.

A number of embodiments of the invention have been described. Nevertheless, it is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:

1. An apparatus comprising a camera rig and image-processing circuitry,
   wherein the camera rig comprises cameras, the cameras comprising a primary camera having a primary field-of-view and a plurality of secondary cameras, each of which has a corresponding secondary field-of-view, the secondary cameras being disposed to avoid occluding the primary field-of-view, the cameras defining camera pairs, constituent cameras of which have overlapping fields-of-view, each of the camera pairs including the primary camera and
   wherein the image-processing circuitry is coupled to the camera rig and configured to generate first data based on second data, the first data representing a stitch-free panoramic image that comprises those portions of each of the respective secondary fields-of-view that lie within the primary field-of-view and a depth map registered with the stitch-free panoramic image, the second data being representative of images obtained from each of the camera pairs and corresponding depth maps registered with each of the images.

2. The apparatus of claim 1, wherein the secondary cameras comprise at least first and second secondary cameras.

3. The apparatus of claim 1, wherein the secondary cameras comprise at least first, second, and third secondary cameras.

4. The apparatus of claim 1, wherein the primary camera is disposed on a first plane that is offset from a second plane on which the secondary cameras are disposed.

5. The apparatus of claim 1, wherein each of the cameras has a lens having a lens axis and wherein the lens axes are aligned with each other.

6. The apparatus of claim 1, wherein each of the cameras has a lens having a lens axis and wherein at least two of the lens axes point in different directions.

7. The apparatus of claim 1, wherein each of the cameras has a lens having a lens axis, wherein the primary camera has a focal plane having pixels, and wherein the axes are oriented to increase pixel density in those regions of the focal plane that correspond to overlaps with images seen by the secondary cameras.

8. The apparatus of claim 1, further comprising a vehicle, wherein the cameras are disposed around the vehicle.

9. The apparatus of claim 1, wherein at least one of the cameras comprises a fisheye lens.

10. The apparatus of claim 1, wherein at least one of the cameras comprises a fisheye lens having a lens axis that is oriented vertically.

11. The apparatus of claim 1, wherein the primary camera comprises a fisheye lens.

12. The apparatus of claim 1, wherein, for each of the camera pairs, the image-processing circuitry is further configured to carry out a first procedure that comprises
   transforming the first image for the secondary camera of the camera pair and the first image for the primary camera according to a first transformation and a second transformation, the first and second transformations being based on a spatial relationship between the secondary camera and the primary camera, thereby yielding a pair of second images, one of which results from having applied a first transformation of the first image from the secondary camera and the other of which results from having applied a second transformation of the first image from the secondary camera,
   computing second depth information from the pair of second images, the second depth information being represented in registration with the second image from the primary camera, and
   transforming the second depth information to yield first depth information based on the secondary camera, the first depth information being registered with the first image from the primary camera.

13. The apparatus of claim 12, wherein transforming the second depth information to yield the first depth information comprises transforming the second depth information into a space defined by a focal plane of the primary camera.

14. The apparatus of claim 12, wherein transforming the second depth information to yield the first depth information comprises transforming the second depth information into a space that is isomorphic to a space defined by a focal plane of the primary camera.

15. The apparatus of claim 12, wherein the image-processing circuitry is further configured to execute a second procedure after having completed the first procedure, the second procedure comprising combining the first depth information obtained from each of the different camera pairs to yield combined depth information, the combined depth information being registered with the first image from the primary camera.

16. The apparatus of claim 15, wherein, for each camera pair, the image-processing circuitry is configured to assign a weight to the first depth information acquired by the camera pair and wherein the image-processor circuitry is further configured to combine the first depth information based at least in part on the weights assigned to the camera pairs.

17. The apparatus of claim 16, wherein the image-processing circuitry is configured to assign the weight based on a parallax error associated with the camera pair.

18. The apparatus of claim 16, wherein the image-processing circuitry comprises a neural network, the neural network having been configured to determine the weights to be assigned to each camera pair when combining the first depth information obtained by each of the camera pairs to obtain the combined depth information.

19. The apparatus of claim 1, wherein, for each secondary camera, the image-processing circuitry is configured to carry out plane sweeping of the secondary camera using the primary camera as a reference, thereby defining a single cost volume with a cost function, the cost function being derived from costs associated with the camera pairs.

20. The apparatus of claim 1, wherein the primary camera is configured to acquire the stitch-free panoramic image.

21. The apparatus of claim 20, wherein the primary field-of-view comprises a 360 degree field-of-view in a first plane and the stitch-free panoramic image comprises an image of said 360 degree field-of-view.

22. The apparatus of claim 21, wherein the primary field-of-view comprises a 250 degree field-of-view in a second plane orthogonal to the first plane and the stitch-free panoramic image comprises an image of said 250 degree field-of-view.

23. A method of acquisition of image and depth information using a plurality of cameras, the cameras including a primary camera and a plurality of secondary cameras, each secondary camera having a respective spatial relationship with the primary camera, the method comprising:

acquiring a plurality of first images, each image of the plurality of first images being acquired via a respective camera of the plurality of cameras, wherein the first image from the primary camera represents a primary field-of-view, and each first image of a secondary camera of the plurality of secondary cameras represents at field-of-view including at least a part of the primary field-of-view;

for each secondary camera of the plurality of secondary cameras
    transforming the first image for the secondary camera and the first image for the primary camera according to a first transformation and a second transformation based on the spatial relationship between the secondary camera and the primary camera, thereby yielding a pair of second images, one second image from the pair being a first transformation of the first image from the secondary camera and one second image being a second transformation of the first image from the primary camera,
    computing second depth information from the pair of images, the second depth information being represented in registration with the second image from the primary camera, and
    transforming the second depth information to yield first depth information based on the secondary camera, the first depth information being registered with the first image from the primary camera; and combining the first depth information based on the plurality of secondary cameras to yield combined depth information, the combined depth information being registered with the first image from the primary camera.

* * * * *